(12) United States Patent
Yokoyama

(10) Patent No.: US 12,346,016 B2
(45) Date of Patent: Jul. 1, 2025

(54) STEREOSCOPIC LENS APPARATUS AND IMAGE PICKUP APPARATUS

(71) Applicant: CANON KABUSHIKI KAISHA, Tokyo (JP)

(72) Inventor: Takayoshi Yokoyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/466,062

(22) Filed: Sep. 13, 2023

(65) Prior Publication Data

US 2024/0103353 A1  Mar. 28, 2024

(30) Foreign Application Priority Data

Sep. 22, 2022  (JP) .................................. 2022-150919

(51) Int. Cl.
  *G03B 35/10*  (2021.01)
(52) U.S. Cl.
  CPC .................................... *G03B 35/10* (2013.01)
(58) Field of Classification Search
  CPC ........ G02B 21/20; G02B 21/22; G03B 35/08; G03B 35/10
  USPC ................. 396/326, 331, 329; 359/375–376
  See application file for complete search history.

(56) References Cited

U.S. PATENT DOCUMENTS

| | | | | |
|---|---|---|---|---|
| 5,062,698 | A * | 11/1991 | Funathu | G02B 23/18 |
| | | | | 359/414 |
| 8,976,271 | B2 | 3/2015 | Yokoyama | |
| 9,977,220 | B2 | 5/2018 | Yokoyama | |
| 2020/0014908 | A1 * | 1/2020 | Ebe | H04N 23/55 |
| 2022/0221688 | A1 | 7/2022 | Yokoyama | |
| 2022/0397816 | A1 * | 12/2022 | Noda | G03B 11/041 |
| 2023/0013707 | A1 | 1/2023 | Yokoyama | |
| 2023/0251460 | A1 | 8/2023 | Yokoyama | |

FOREIGN PATENT DOCUMENTS

| | | | | |
|---|---|---|---|---|
| JP | 2004077600 A | * | 3/2004 | |
| JP | 3794519 B2 | * | 7/2006 | |
| JP | 2020-008629 A | | 1/2020 | |
| JP | 2021051282 A | * | 4/2021 | ............. G02B 15/14 |
| JP | 7500505 B2 | * | 6/2024 | ............. G02B 7/006 |

* cited by examiner

*Primary Examiner* — Christopher E Mahoney
(74) *Attorney, Agent, or Firm* — Carter, DeLuca & Farrell LLP

(57) ABSTRACT

A stereoscopic lens apparatus includes two optical systems disposed in parallel. The two optical systems each include a front group, a reflection unit, and a rear group that are disposed in order from an object side to an image side, and an optical axis interval between the rear groups of the two optical systems is shorter than an optical axis interval between the front groups of the two optical systems due to optical path bending by the reflection unit. The rear groups of the two optical systems each include a movable unit that can be moved. The stereoscopic lens apparatus further includes a holder integrally holding the movable units of the two optical systems, and an actuator configured to drive the holder.

19 Claims, 10 Drawing Sheets

STEREOSCOPIC LENS APPARATUS AND IMAGE PICKUP APPARATUS

BACKGROUND

Technical Field

One of the aspects of the embodiments relates to a stereoscopic lens apparatus suitable for image capturing of a stereoscopically viewable image (stereoscopic image).

Description of Related Art

A stereoscopic lens apparatus has been used that enables acquisition of a stereoscopic image by image capturing and in which two optical systems are disposed in parallel to have parallax therebetween. Japanese Patent Laid-open No. 2020-008629 discloses a stereoscopic lens apparatus in which two optical systems are disposed in parallel and two reflection members are disposed in each optical system to bend the optical path. Since the optical path is bent, it is possible to ensure the baseline length between object-side lens units of the two optical systems and reduce the interval between image-side lens units of the two optical systems so that image circles of the two optical systems are formed on a single image sensor.

In a case where an autofocus mechanism is mounted in the stereoscopic lens apparatus as described above, for example, the image-side lens units, which are lighter than the object-side lens unit, are driven as focus lens units. However, in a case where there is drive difference between the focus lens units of the two optical systems, difference in focus state and image magnification occurs between object images formed through the two optical systems, respectively. Furthermore, in a case where an image stabilizing lens unit that shifts relative to the optical axis to reduce image blurs caused by manual shake or the like is disposed in each of the two optical systems, drive difference between the image stabilizing lens units leads to difference in blur state between object images formed through the two optical systems, respectively.

SUMMARY

A stereoscopic lens apparatus according to one aspect of the embodiment includes two optical systems disposed in parallel. The two optical systems each include a front group, a reflection unit, and a rear group that are disposed in order from an object side to an image side, and an optical axis interval between the rear groups of the two optical systems is shorter than an optical axis interval between the front groups of the two optical systems due to optical path bending by the reflection unit. The rear groups of the two optical systems each include a movable unit that can be moved. The stereoscopic lens apparatus further includes a holder integrally holding the movable units of the two optical systems, and an actuator configured to drive the holder. An image pickup apparatus having the above stereoscopic lens apparatus also constitutes another aspect of the embodiment.

Further features of the disclosure will become apparent from the following description of embodiments with reference to the attached drawings.

DESCRIPTION OF THE EMBODIMENTS

Examples of the present disclosure will be described below with reference to the accompanying drawings.

A stereoscopic lens apparatus (hereinafter simply referred to as a lens apparatus) of an example includes two optical systems disposed in parallel to acquire a stereoscopically viewable image, and is used in various image pickup apparatuses such as a digital still camera, a video camera, a broadcasting camera, and a monitoring camera.

Figure 1:
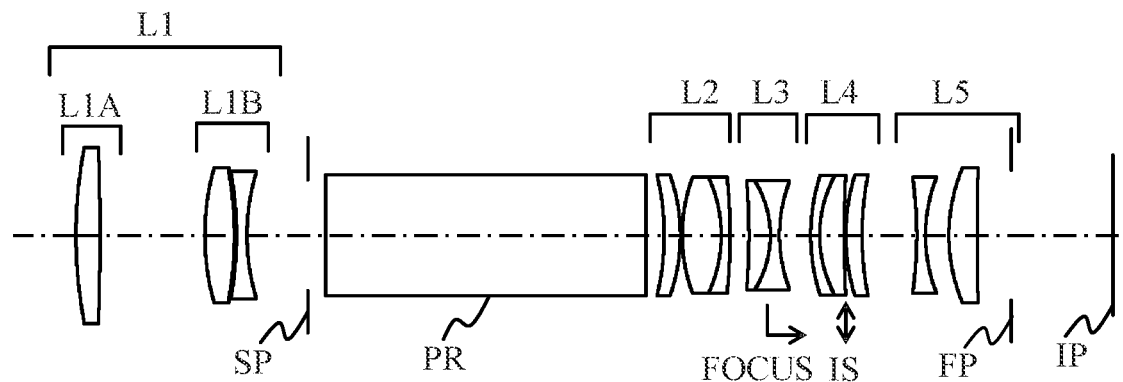
FIG. 1 is a sectional view of an optical system according to Example 1 (Numerical Example 1).
Figure 2:
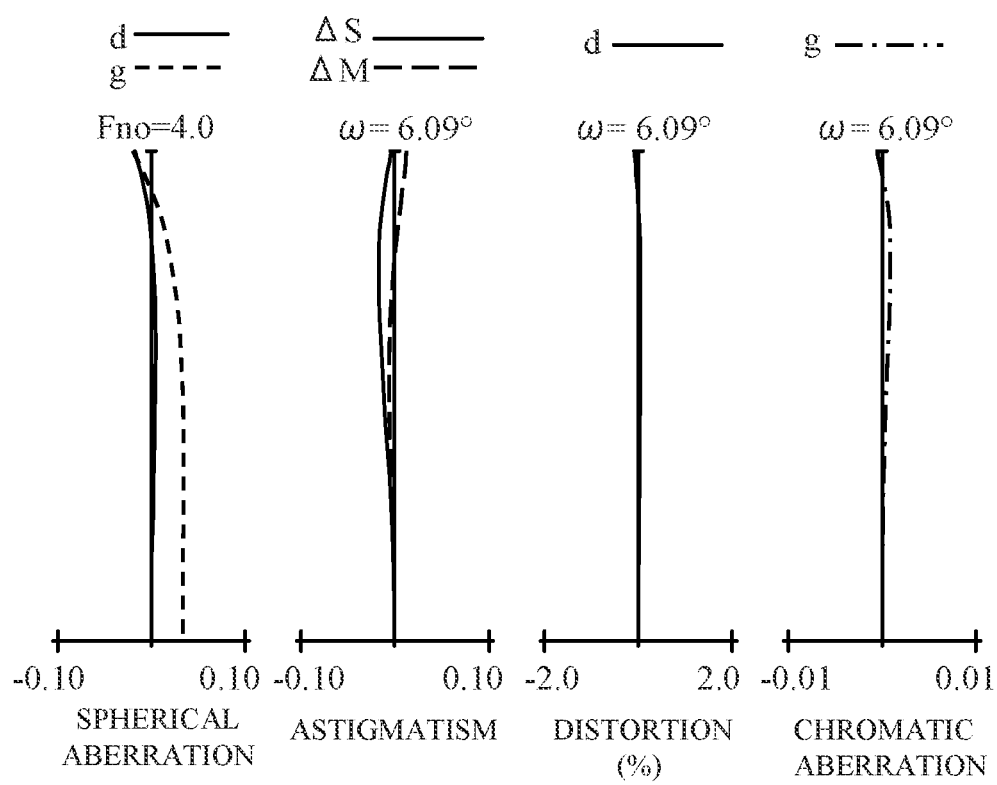
FIG. 2 is a longitudinal aberration diagram of the optical system according to Numerical Example 1.
Figure 3:
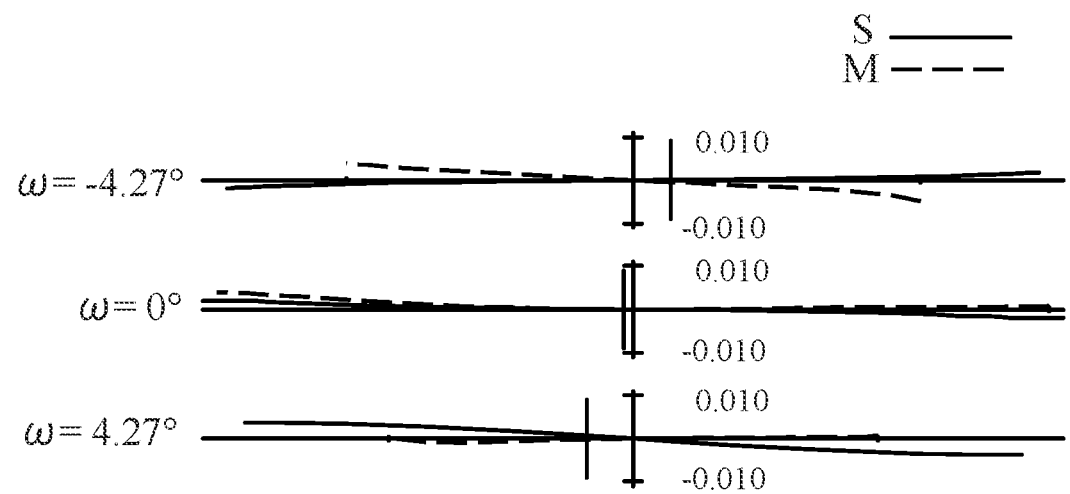
FIG. 3 is a lateral aberration diagram of the optical system according to Numerical Example 1 during image stabilization.
Figure 4:
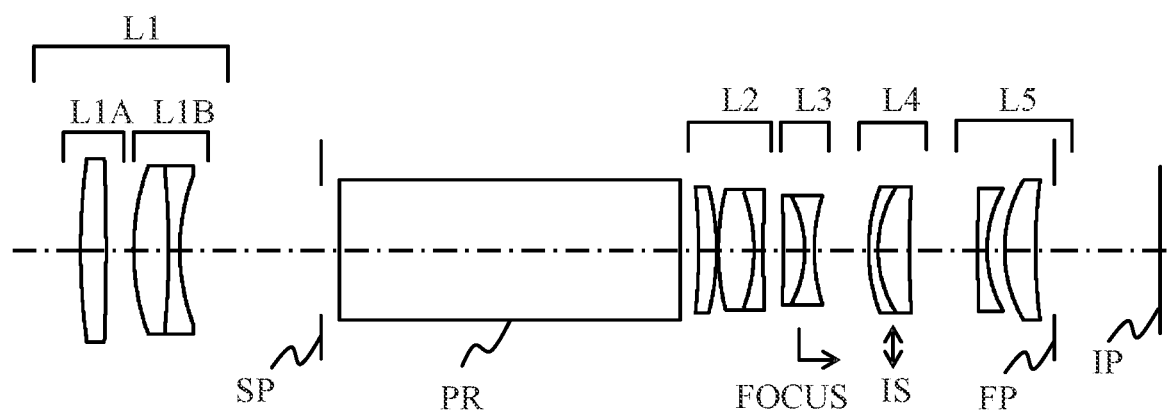
FIG. 4 is a sectional view of an optical system according to Example 2 (Numerical Example 2).
Figure 5:
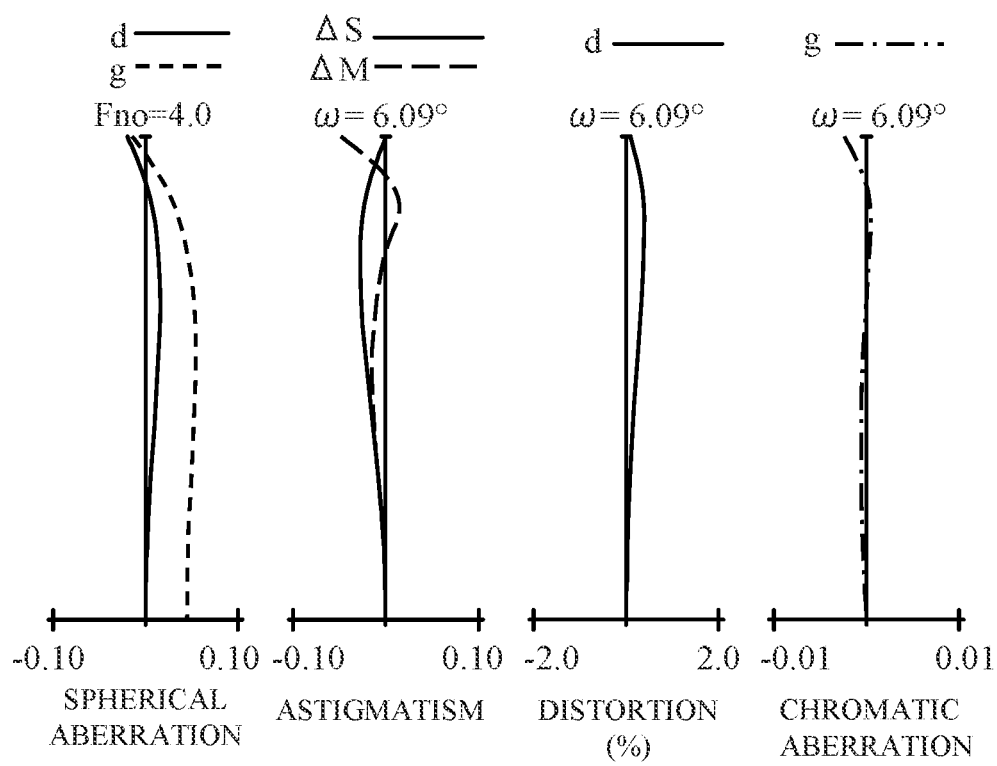
FIG. 5 is a longitudinal aberration diagram of the optical system according to Numerical Example 2.
Figure 6:
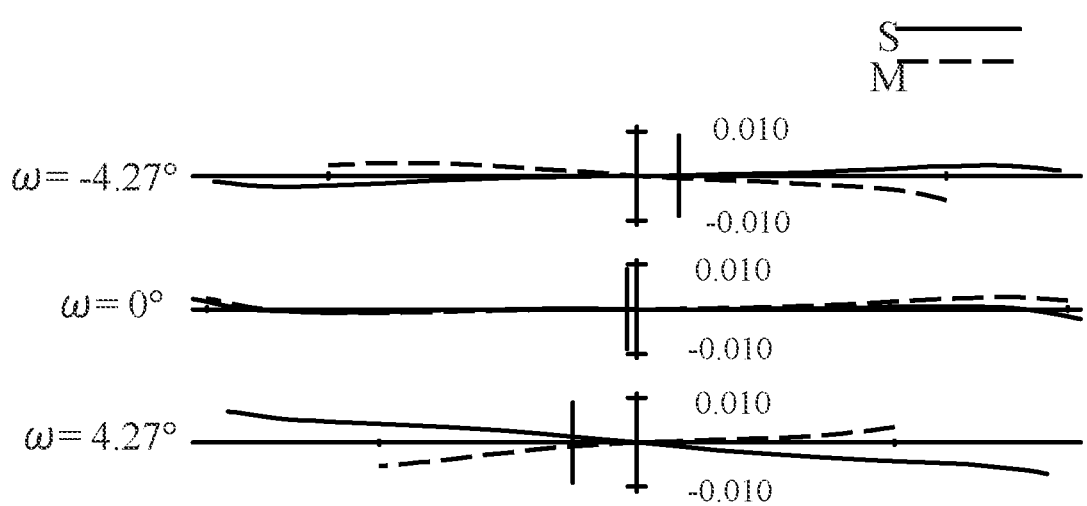
FIG. 6 is a lateral aberration diagram of the optical system according to Numerical Example 2 during image stabilization.
Figure 7:
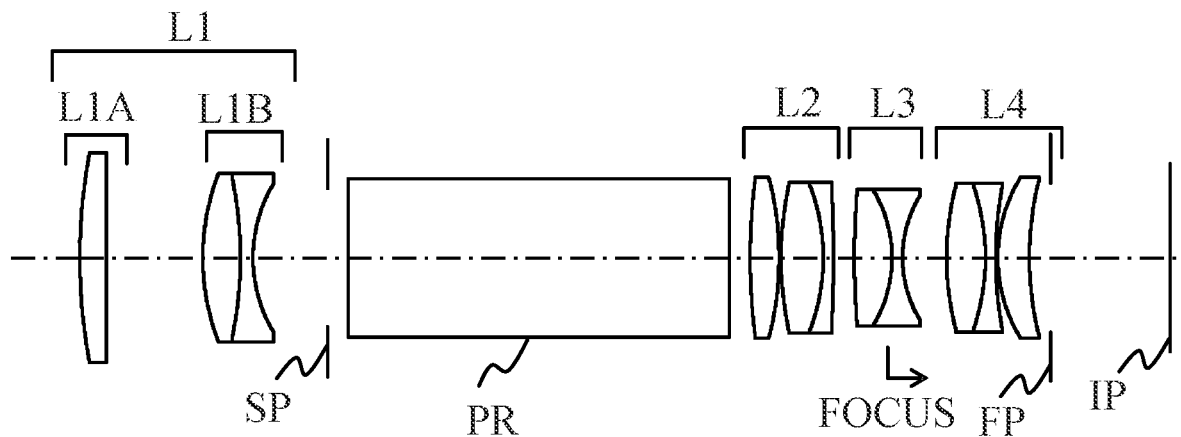
FIG. 7 is a sectional view of an optical system according to Example 3 (Numerical Example 3).
Figure 8:
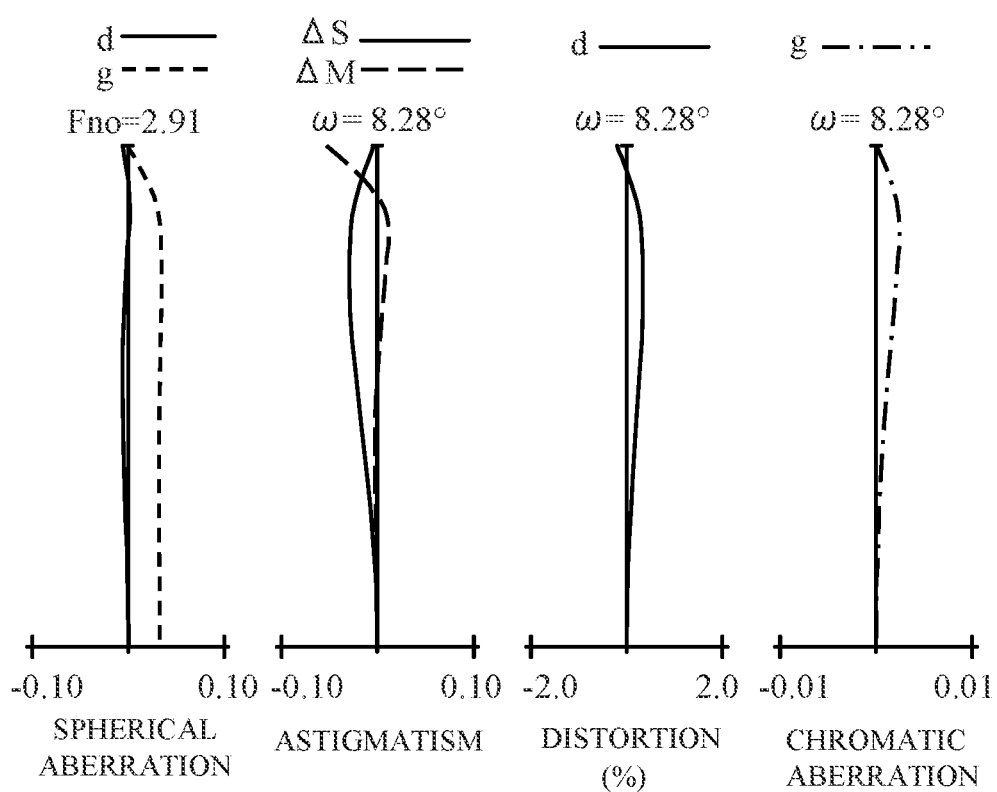
FIG. 8 is a longitudinal aberration diagram of the optical system according to Numerical Example 3.
Figure 9:
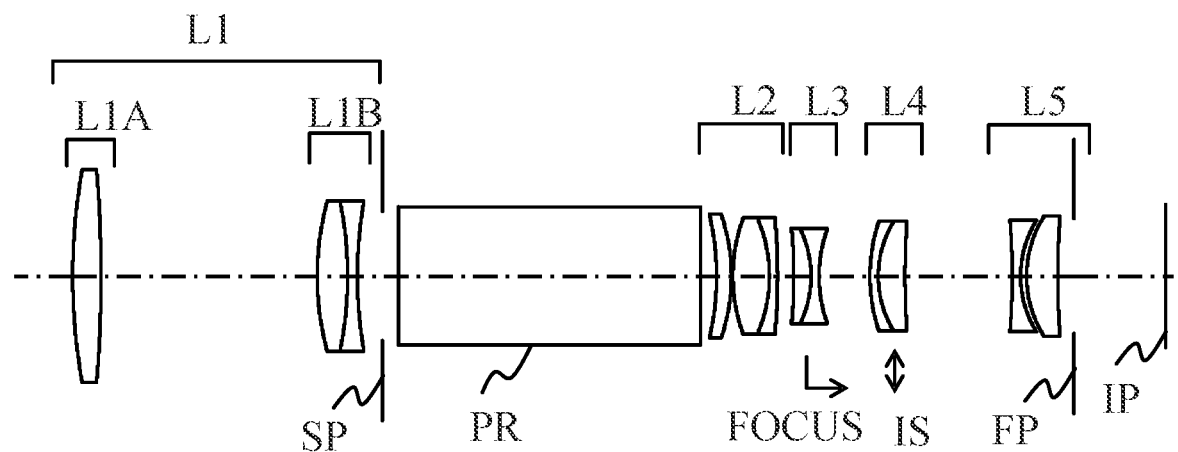
FIG. 9 is a sectional view of an optical system according to Example 4 (Numerical Example 4).
Figure 10:
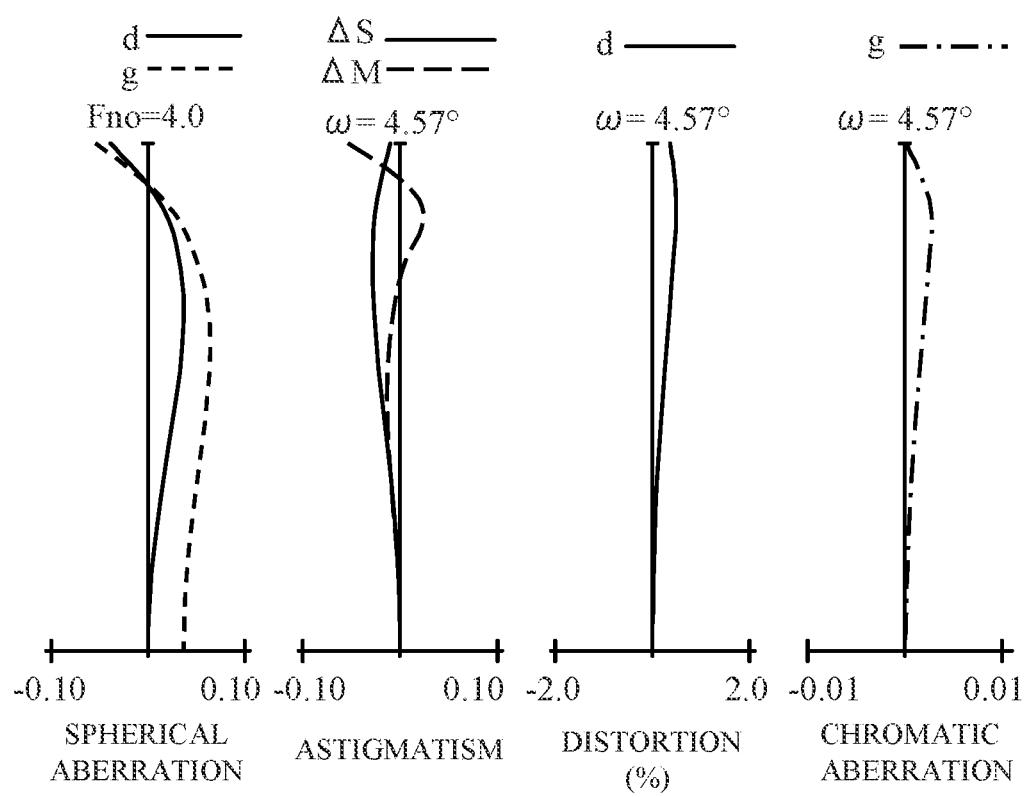
FIG. 10 is a longitudinal aberration diagram of the optical system according to Numerical Example 4.
Figure 11:
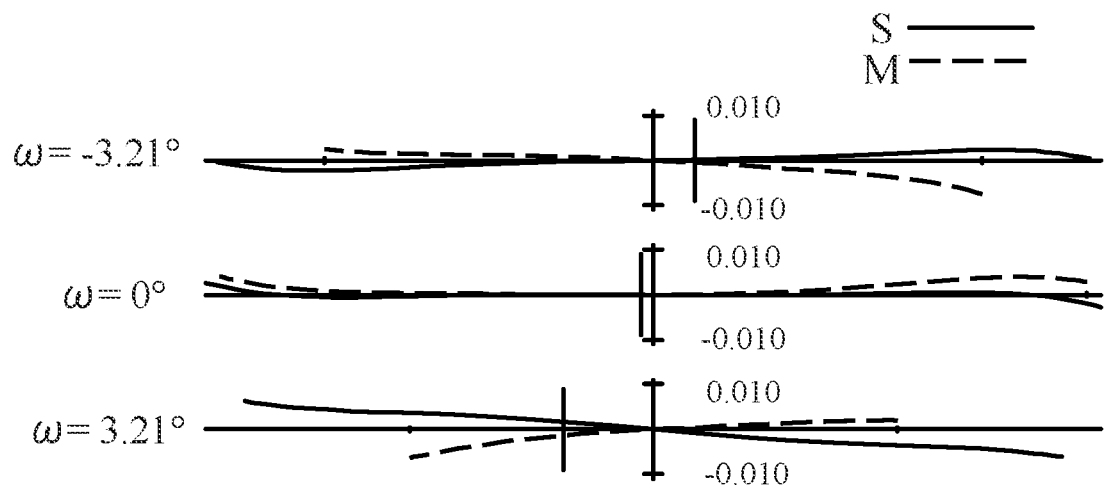
FIG. 11 is a lateral aberration diagram of the optical system according to Numerical Example 4 during image stabilization.
Figure 12:
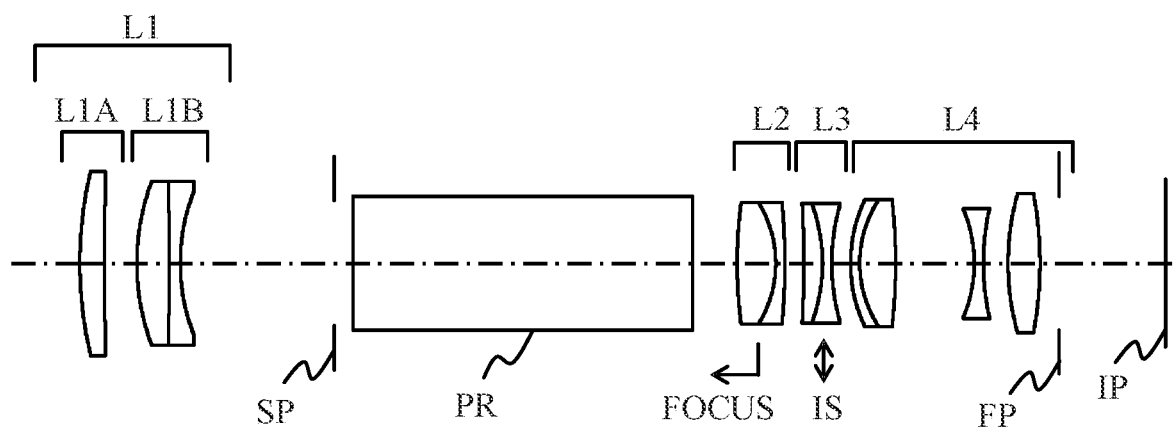
FIG. 12 is a sectional view of an optical system according to Example 5 (Numerical Example 5).
Figure 13:
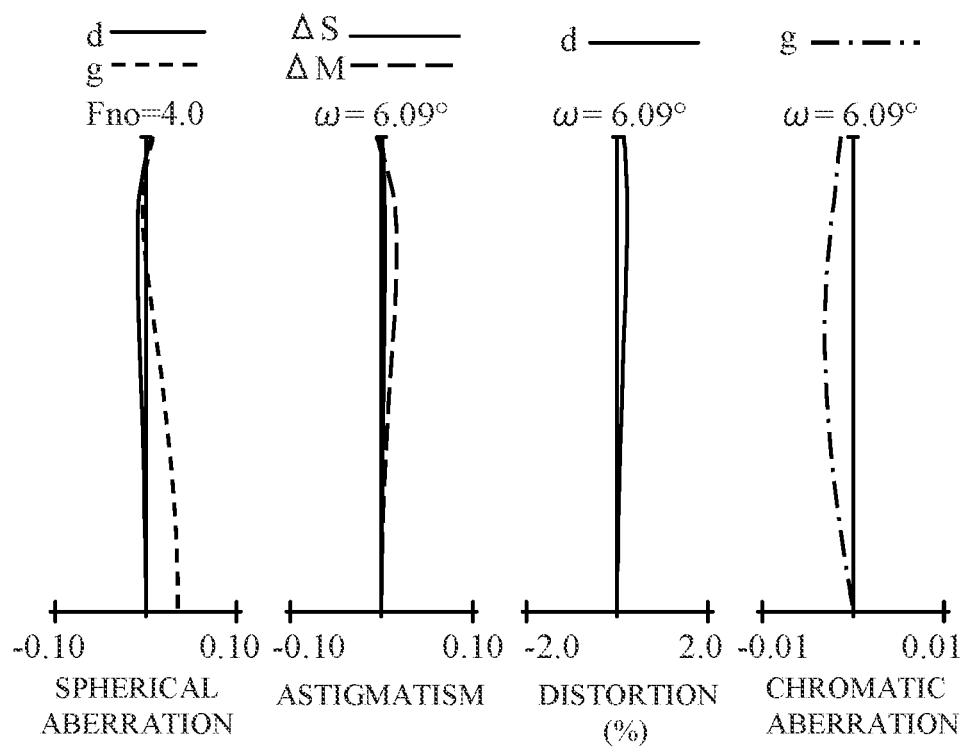
FIG. 13 is a longitudinal aberration diagram of the optical system according to Numerical Example 5.
Figure 14:
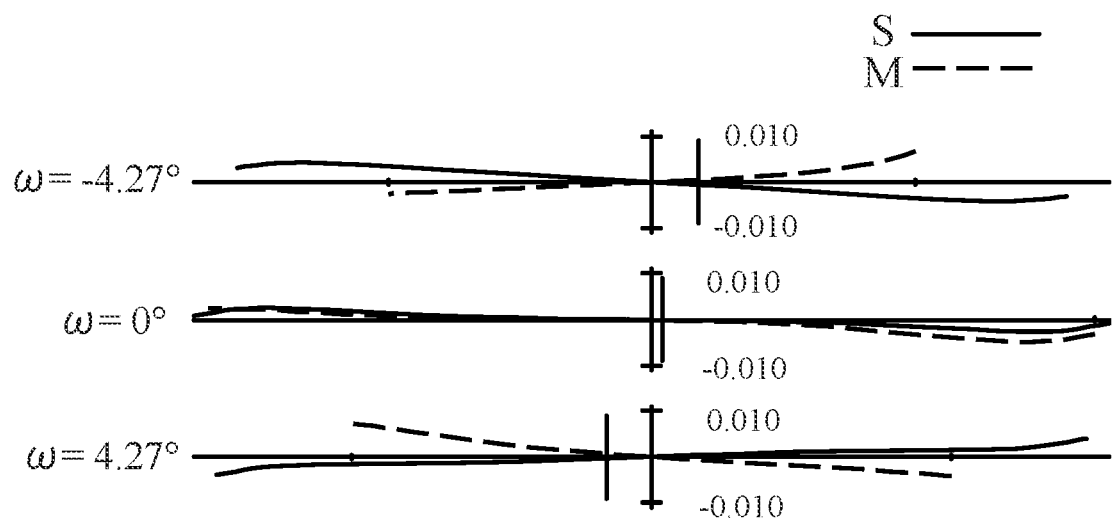
FIG. 14 is a lateral aberration diagram of the optical system according to Numerical Example 5 during image stabilization.
Figure 15:
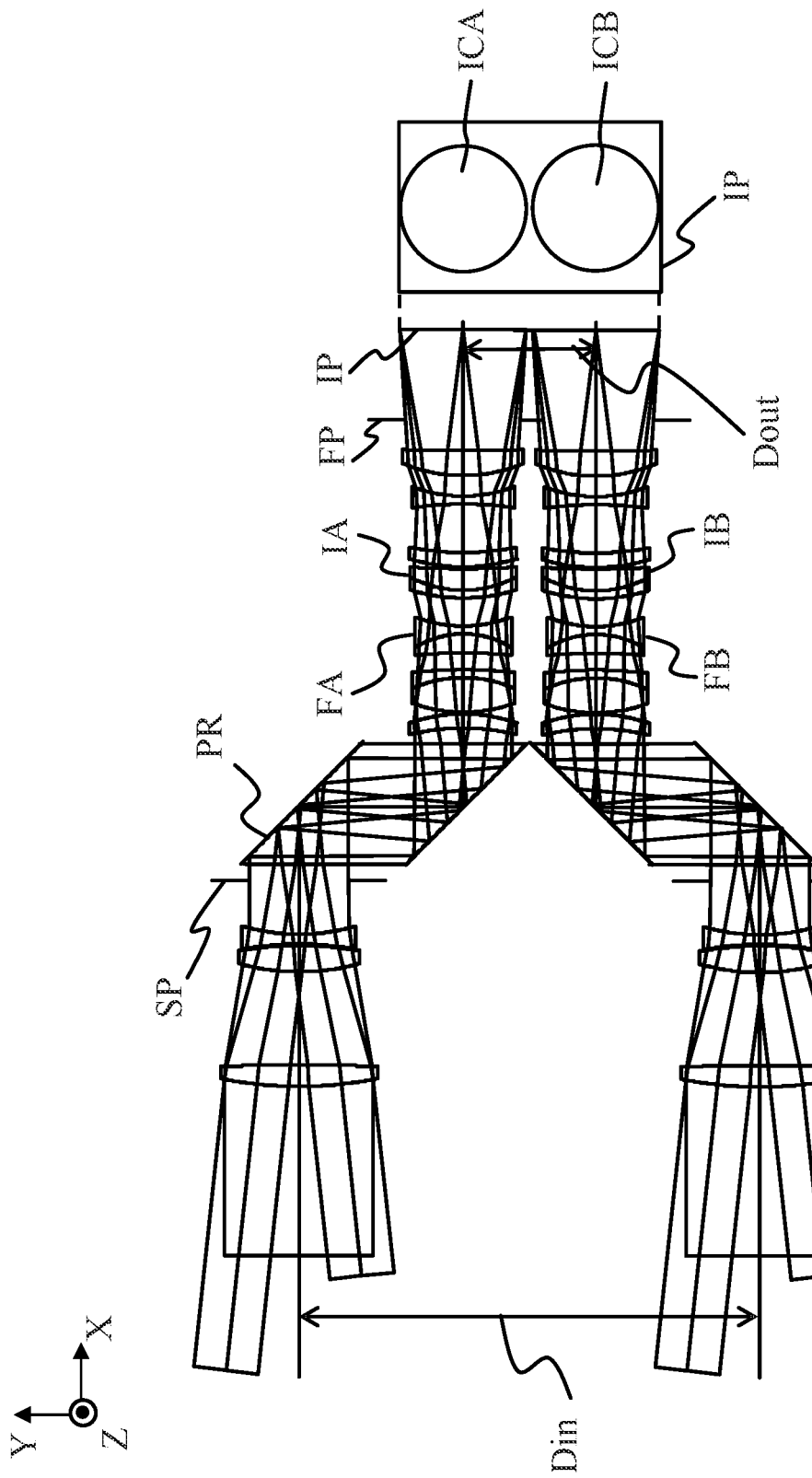
FIG. 15 is a plan view of a stereoscopic optical system including two optical systems according to Example 1.

FIG. 15 illustrates two optical systems in a lens apparatus according to Example 1 when viewed in a Z direction. In this diagram, an X direction is defined to be a direction from an object side on the left side toward an image side on the right side, and a Y direction is defined to be a direction in which the two optical systems are disposed in parallel. The Z direction is defined to be direction orthogonal to the X and Y directions (upward direction perpendicular to the sheet of the diagram).

The two optical systems each include a front group, an aperture stop (hereinafter simply referred to as an aperture) SP, a reflection unit PR, and a rear group that are disposed in order from the object side to the image side. The two optical systems each bend, twice in the reflection unit PR, a light beam (optical path) incident from the front group and form an image circle ICA or ICB on an imaging surface (IP)

of one (single) image sensor through the rear group. A baseline length Din that is the distance between the apexes of lens surfaces positioned closest to the object in the two optical systems, in other words, the interval (optical axis interval) between the optical axes of the front groups is set to 60 mm approximately, which corresponds to the interval between the right and left eyes of a person. The distance between the apexes of lens surfaces positioned closest to the image plane in the two optical systems (the optical axis interval between the rear groups) Dout is shorter than the baseline length.

FA and FB denote focus lens units as movable units provided in the rear groups of the two optical systems, respectively, and IA and IB denote image stabilizing lens units as other movable units provided in the rear groups, respectively. The focus lens units FA and FB move in their optical axis directions to perform focusing. The image stabilizing lens units IA and IB move (shift) relative to the optical axes of the rear groups in accordance with lens shake such as manual shake to perform optical image stabilization that reduces (corrects) image blurs. A movable unit and a lens unit are each a group of one or a plurality of lenses that integrally move in, for example, focusing and optical image stabilization, and are each also a group of one or a plurality of lenses adjacent to the lens unit that moves. The lens unit may include an aperture stop.

FIGS. 1, 4, 7, 9, and 12 each illustrate a section of one of two optical systems included in the corresponding one of lens apparatuses according to Examples 1, 2, 3, 4, and 5 (Numerical Examples 1 to 5). In each drawing, the object side is on the left side, and the image side is on the right side. The configuration of the other optical system is the same as that of the one optical system except that the direction of light reflection in the reflection unit PR is different. In each sectional view, the reflection unit PR is expanded in the optical axis direction of the optical system.

Examples 1, 2, 4, and 5 each include the focus lens units FA and FB and the image stabilizing lens units IA and IB, but Example 3 includes no image stabilizing lens units. An example of the present disclosure only needs to include at least one of focus lens units or image stabilizing lens units. Moreover, the rear group may include any other lens unit as a movable unit that can be moved than focus lens units and image stabilizing lens units.

In each sectional view, L1 denotes the front group, and L2 to L5 denote lens units constituting the rear group. FP provided in the rear group denotes a visual field aperture that determines an off-axis light beam. IP denotes an imaging plane. The imaging surface of an image sensor (photoelectric conversion element) such as a CCD sensor or a CMOS sensor is disposed at the imaging plane IP. In a case where the lens apparatus is used in a silver salt film camera, the film surface of a silver salt film is disposed at the imaging plane IP.

Although not illustrated, an optical block such as an optical filter, a faceplate, a lowpass filter, or an infrared cut filter may be disposed between the imaging plane IP and the optical system. The reflection unit PR is constituted by a single optical member such as a prism having two reflection surfaces (first reflection surface and second reflection surface). However, the reflection unit may include two reflection members (mirrors) each having a reflection surface. The first reflection surface and the second reflection surface each bend the optical path by 45°.

In each example (numerical example), a typical image sensor is used that includes an imaging surface having a length of 24 mm on the short side and a length of 36 mm on the long side. With a configuration in which two optical systems including no reflection units are disposed in parallel and the baseline length of 60 mm approximately is set, the image circles of the two optical systems do not fall in the imaging surface having a length of 36 mm on the long side. Thus, in the optical system of each example, two reflection surfaces are disposed to bend the optical path so that the image circles ICA and ICB of the two optical systems fall in the imaging surface of the single image sensor as illustrated in FIG. 15.

Since the length of the imaging surface on the long side is 36 mm, a region in which the image circle of each optical system is formed on the imaging surface has the half-length of 18 mm in the long side direction. In this example, each image circle has a length of 16.00 mm, and the interval of 2 mm is set between the image circles of the two optical systems. Each image circle is a region in which an optical image captured to obtain a viewable image is formed. Outside the image circles, there is a region not suitable for image capturing for obtaining a viewable image due to insufficiency of light quantity and degradation of optical performance of the corresponding optical system. The interval of 2 mm is set between the image circles of the two optical systems based on consideration of existence of a region in which light quantity is not zero outside the image circles as well as positional shift of the image circles due to manufacturing error. In this case, the optical axis interval Dout between the front groups of the two optical systems is 18.0 mm.

In the optical system according to Numerical Example 1, the optical axis interval Din between the front groups is set to 60.00 mm, the first reflection surface is set at the position of 7.75 mm from the entrance surface of the reflection unit PR, and the second reflection surface is set at the position of 21.00 mm from the first reflection surface.

In the optical system according to Numerical Example 2, the optical axis interval Din between the front groups is set to 62.50 mm, the first reflection surface is set at the position of 7.50 mm from the entrance surface of the reflection unit PR, and the second reflection surface is set at the position of 22.25 mm from the first reflection surface.

In the optical system according to Numerical Example 3, the optical axis interval Din between the front groups is set to 54.00 mm, the first reflection surface is set at the position of 9.25 mm from the entrance surface of the reflection unit PR, and the second reflection surface is set at the position of 18.00 mm from the first reflection surface.

In the optical system according to Numerical Example 4, the optical axis interval Din between the front groups is set to 59.50 mm, the first reflection surface is set at the position of 8.75 mm from the entrance surface of the reflection unit PR, and the second reflection surface is set at the position of 20.75 mm from the first reflection surface.

In the optical system according to Numerical Example 5, the optical axis interval Din between the front groups is set to 62.50 mm, the first reflection surface is set at the position of 7.25 mm from the entrance surface of the reflection unit PR, and the second reflection surface is set at the position of 22.25 mm from the first reflection surface.

The optical axis interval between the front groups and the positions of the reflection surfaces may be set in accordance with specifications such as the size of the image sensor, the baseline length and peripheral light quantity of the optical system, the size of each image circle, and the interval between the two image circles.

The optical system of each numerical example is a telephoto lens of a central projection scheme. However, the optical system may be a fish-eye lens as disclosed in Patent Literature 1. The projection scheme in the case of a fish-eye lens may be set to an equal-angle projection scheme, an equal-stereoscopic-angle projection scheme, an orthogonal projection scheme, or the like.

Two images that are favorable for stereoscopic viewing cannot be acquired in a case where there is drive difference (difference in drive timing or drive position) between the movable units, which are the focus lens units and the image stabilizing lens units of the two optical systems, in a case where the image circles of the two optical systems are formed on the single image sensor as described above. In a case where there is drive difference between the focus lens units, difference in image magnification occurs between the two optical systems, and as a result, a viewer in stereoscopic viewing cannot fuse an image or the resolution of an observation image decreases. Although it is possible to correct difference in image magnification by image processing, load, and time of the image processing increase.

Thus, in the lens apparatus of each example, a holder is provided to integrally hold the movable units of the two optical systems, and the holder is driven by an actuator. Accordingly, drive difference between the movable units of the two optical systems is reduced.

Figure 16A:
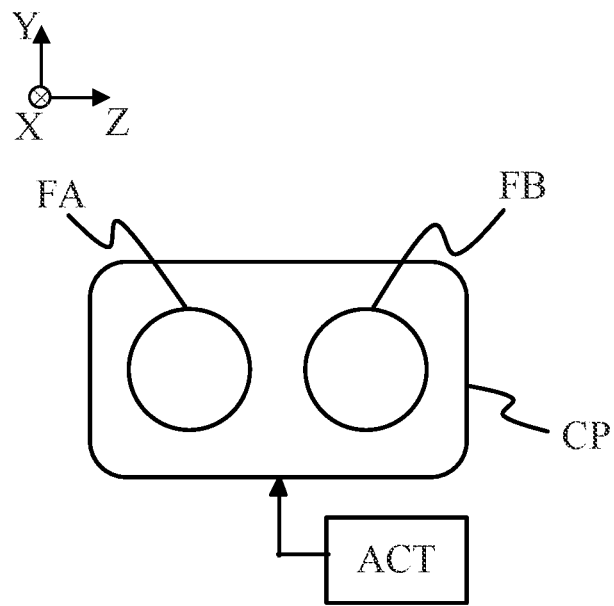
FIGS. 16A and 16B illustrate a configuration in which focus lens units of the two optical systems are integrally held.
Figure 16B:
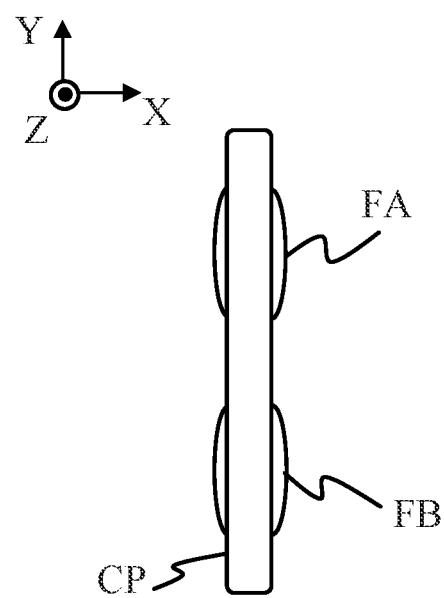

As illustrated in FIG. 15, the rear groups of the two optical systems are disposed in proximity to each other right before the image sensor (IP). Since the movable units of the two optical systems are disposed in proximity, the focus lens units FA and FB can be easily integrally held by a holder CP as illustrated in, for example, FIGS. 16A and 16B. Drive difference between the focus lens units FA and FB in focusing can be reduced (eliminated) by driving the holder CP in the optical axis direction with an actuator ACT. Moreover, since it suffices to provide the one actuator ACT unlike a case where an actuator is provided for each of the focus lens units FA and FB, the size and electric power consumption of the lens apparatus can be reduced.

Figure 17A:
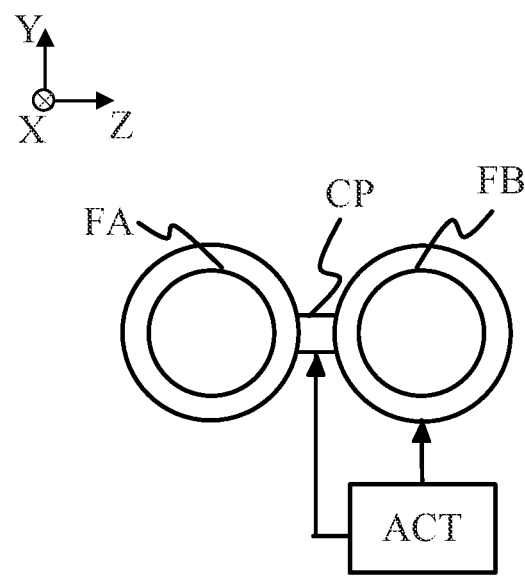
FIGS. 17A and 17B illustrate another configuration in which the focus lens units of the two optical systems are integrally held.
Figure 17B:
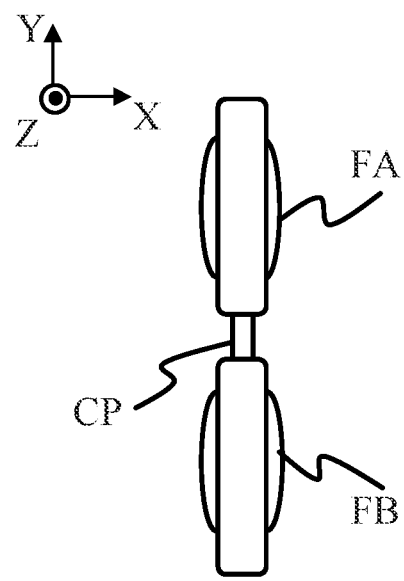

In a case where the focus lens units FA and FB of the two optical systems are held by separate barrel components as illustrated in FIGS. 17A and 17B, the holder CP may be provided to integrally connect the barrel components, in other words, integrally hold the focus lens units FA and FB. In this case, a holder integrally holding the focus lens units FA and FB is constituted by holder bodies that are the barrel components holding the focus lens units FA and FB, respectively, and by the holder CP as a connection unit connecting the holder bodies. Drive difference between the focus lens units FA and FB can be reduced (eliminated) by driving the holder CP as the connection unit with the actuator ACT. As illustrated with a dashed line in the drawing, one of the barrel components integrally connected by the holder CP may be driven with the actuator ACT instead of directly driving the holder CP with the actuator ACT. Any of the configurations illustrated in FIGS. 16A, 16B, 17A, and 17B corresponds to a configuration in which a holder integrally holding the movable units is driven with an actuator. The configurations in FIGS. 16A, 16B, 17A, and 17B are also applicable to the image stabilizing lens units IA and IB.

The front groups of the two optical systems are largely separated from each other to ensure the baseline length, and thus the size of the lens apparatus increases in a case where the front groups are held by one large holder. Furthermore, the weight of a driven unit including the holder and the two front groups increases, and accordingly, electric power consumption by the actuator increases.

However, in each example, since the movable units provided in the two rear groups in proximity to each other are integrally held by a holder and the holder is driven by the actuator, drive difference between the two movable units is reduced and electric power consumption is reduced as well.

As described above, each reflection unit PR may be formed of a single optical member having two reflection surfaces. In a case where the two reflection surfaces are provided at separate members, positional shift of the corresponding image circle on the imaging surface increases due to assembly error at manufacturing of the lens apparatus. As a result, there occur problems that, for example, part of the image circle is positioned outside the imaging surface and the image circles interfere with each other. In order to prevent the problems, it is needed to set the size of each image circle to be small, and in such a case, the number of pixels of an image obtained by image capturing decreases, which leads to degradation of image quality.

In a case where the two reflection surfaces are formed at one optical member, the aperture stop SP may be disposed on the object side of the reflection unit PR. As illustrated in FIG. 15, the rear groups of the two optical systems on the image side of the reflection units PR are disposed in proximity to each other. Thus, it is difficult to dispose the aperture stops SP of the two optical systems without interference with each other in a case where the aperture stop SP are disposed on the image side of the reflection units PR.

A lens unit having positive refractive power (positive lens unit) may be disposed closest to the object in each rear group. The diameters of lenses constituting the rear groups need to be decreased to avoid interference between the rear groups disposed in proximity to each other. However, in the optical system of each example, the reflection unit PR is disposed to bend the optical path twice, and the optical path length from the aperture stop SP to the rear group through the reflection unit PR is long. Accordingly, the lens diameter of the rear group tends to be large. Thus, a positive lens unit may be disposed closest to the object in the rear group to converge an off-axis light beam, which allows reduction of the lens outer diameter of the rear group.

The following inequality (1) may be satisfied:

$$0.20 \leq fp/d \leq 1.20 \tag{1}$$

where fp represents the focal length of the positive lens unit positioned closest to the object in each rear group and d represents the distance on the optical axis from the aperture stop SP to a lens surface positioned closest to the object in the positive lens unit.

Inequality (1) defines a condition for reducing the lens diameter of each rear group and achieving high optical performance. In a case where fp/d is smaller than the lower limit value of inequality (1), power of the positive lens unit is too strong, and accordingly, off-axis aberrations such as astigmatism and field curvature increase. Moreover, the positive lens unit strongly converges an on-axis light beam, and thus increase of spherical aberration is large. In a case where fp/d is larger than the upper limit value of inequality (1), it is difficult to reduce the lens diameter of each rear group, and interference occurs between the rear groups.

Inequality (1) may be replaced with inequality (1a) below:

$$0.30 \leq fp/d \leq 1.00 \tag{1a}$$

Inequality (1) may be replaced with inequality (1b) below:

$$0.40 \leq fp/d \leq 0.90 \tag{1b}$$

A movable unit that performs focusing or optical image stabilization may be disposed on the image side of the positive lens unit disposed closest to the object in each rear group. In a case where the movable unit is provided as a lens unit at a position to which a light beam is converged through the positive lens unit, the size and weight of the movable unit can be reduced. As a result, the size and electric power consumption of the lens apparatus can be reduced.

A focus lens unit as the movable unit may be a lens unit having negative refractive power (movable negative lens unit). In a case where, in each rear group, the focus lens unit as the movable negative lens unit is disposed on the image side of the positive lens unit having strong power and positioned closest to the object, focus sensitivity that is the ratio of the moving amount of the imaging plane relative to the moving amount of the focus lens unit can be high. Accordingly, the moving amount of the focus lens unit necessary for focusing can be reduced, and as a result, the length of the rear group in the optical axis direction can be shortened and the lens diameter can be reduced.

The following inequality (2) may be satisfied:

$$-0.45 \leq fs/f \leq -0.15 \tag{2}$$

where fs represents the focal length of the focus lens unit as the movable negative lens unit and f represents the focal length of the whole optical system.

Inequality (2) defines a condition for appropriate refractive power of the focus lens unit for optical performance and size reduction of the optical system. In a case where fs/f is smaller than the lower limit value of inequality (2), the refractive power of the focus lens unit is too low, and accordingly, the moving amount thereof for performing focusing becomes large. As a result, the diameters of the focus lens unit and subsequent lenses increase, and interference occurs between the rear groups. In a case where fs/f is larger than the upper limit value of inequality (2), the refractive power of the focus lens unit is too strong, and accordingly, degradation of optical performance due to focusing increases.

Inequality (2) may be replaced with inequality (2a) below:

$$-0.40 \leq fs/f \leq -0.16 \tag{2a}$$

Inequality (2) may be replaced with inequality (2b) below:

$$-0.35 \leq fs/f \leq -0.18 \tag{2b}$$

An image stabilizing lens unit as the movable unit may be a lens unit having positive refractive power (movable positive lens unit). In a case where optical image stabilization is performed by a lens unit largely separated from the aperture stop SP toward the imaging plane, the refractive power of the lens unit needs to be strong to reduce the size of a mechanism that drives the lens unit. However, in a case where the image stabilizing lens unit has negative refractive power, the strong refractive power results in too large positive distortion, which leads to a narrow angle of view for obtaining a favorable image. Thus, the image stabilizing lens unit may have positive refractive power.

The following inequality (3) may be satisfied:

$$0.20 \leq fi/f \leq 0.65 \tag{3}$$

where fi represents the focal length of the image stabilizing lens unit as the movable positive lens unit.

Inequality (3) defines a condition for appropriate refractive power of the image stabilizing lens unit for optical performance and size reduction of the optical system. In a case where fi/f is smaller than the lower limit value of inequality (3), the refractive power of the image stabilizing lens unit is too strong, and accordingly, for example, eccentric chromatic aberration and eccentric coma in optical image stabilization become large. In a case where fi/f is larger than the upper limit value of inequality (3), the refractive power of the image stabilizing lens unit is too weak, and accordingly, the drive amount of the image stabilizing lens unit for optical image stabilization becomes large and the size of a mechanism that drives the image stabilizing lens unit increases.

Inequality (3) may be replaced with inequality (3a) below:

$$0.25 \leq fi/f \leq 0.60 \tag{3a}$$

Inequality (3) may be replaced with inequality (3b) below:

$$0.30 \leq fi/f \leq 0.55 \tag{3b}$$

The following inequality (4) may be satisfied:

$$0.060 \leq \beta is \leq 0.600 \tag{4}$$

where $\beta is$ represents the lateral magnification of the image stabilizing lens unit in an in-focus state at infinity.

Inequality (4) defines a condition relating to image stabilization sensitivity of the image stabilizing lens unit. In a case where $\beta is$ is smaller than the lower limit value of inequality (4), the image stabilization sensitivity is too high, and accordingly, it becomes difficult to control the position of the image stabilizing lens unit in optical image stabilization. In a case where $\beta is$ is larger than the upper limit value of inequality (4), the image stabilization sensitivity is too low, and accordingly, the moving amount of the image stabilizing lens unit in optical image stabilization becomes large and the size of a mechanism that drives the image stabilizing lens unit increases.

Inequality (4) may be replaced with inequality (4a) below:

$$0.080 \leq \beta is \leq 0.500 \tag{4a}$$

Inequality (4) may be replaced with inequality (4b) below:

$$0.100 \leq \beta is \leq 0.400 \tag{4b}$$

Each rear group may include the positive lens unit, the focus lens unit as the movable negative lens unit, and the image stabilizing lens unit as the movable positive lens unit. Since the focus lens unit as the movable negative lens unit is disposed on the image side of the positive lens unit as described above, the moving amount of the focus lens unit in focusing can be reduced. Moreover, the movable negative lens unit has an effect of diverging an off-axis light beam, and thus the off-axis light beam is converged again by the following image stabilizing lens unit as the movable positive lens unit so that the lens diameter of the rear group can be reduced.

A lens unit having negative refractive power (negative lens unit) may be disposed closest to the image plane in the rear group. In a case where the negative lens unit is disposed closest to the image plane, the optical system can have a telephoto-type configuration so that the overall length of the optical system is shortened. Moreover, since the negative lens units are disposed on the object side and the image side of the image stabilizing lens unit as the movable positive lens unit, eccentric aberration that occurs in optical image stabilization can be reduced to improve the quality of an image obtained by image capturing.

The following inequality (5) may be satisfied:

$$-1.20 \leq fr/f \leq -0.40 \tag{5}$$

where fr represents the focal length of the negative lens unit positioned closest to the image plane in the rear group.

Inequality (5) defines a condition for achieving high image quality and size reduction. In a case where fr/f is smaller than the lower limit value of inequality (5), the refractive power of the negative lens unit positioned closest to the image plane in the rear group is too weak, and accordingly, the above-described overall length reduction effect reduces and the size of the lens apparatus increases. In a case where fr/f is larger than the upper limit value of inequality (5), the refractive power of the negative lens unit positioned closest to the image plane in the rear group is too strong, and accordingly, off-axis aberrations such as astigmatism and field curvature increase.

Inequality (5) may be replaced with inequality (5a) below:

$$-1.05 \leq fr/f \leq -0.50 \tag{5a}$$

Inequality (5) may be replaced with inequality (5b) below:

$$-0.90 \leq fr/f \leq -0.60 \tag{5b}$$

The following inequality (6) may be satisfied:

$$1.000 \leq \beta r \leq 1.800 \tag{6}$$

where βr represents the lateral magnification of the negative lens unit positioned closest to the image plane in the rear group in an in-focus state at infinity.

Inequality (6) defines a condition relating to image stabilization sensitivity and optical performance of the image stabilizing lens unit. In a case where βr is smaller than the lower limit value of inequality (6), image stabilization sensitivity of the image stabilizing lens unit is too low, and accordingly, the moving amount of the image stabilizing lens unit in optical image stabilization becomes large and the size of a mechanism that drives the image stabilizing lens unit increases. In a case where βr is larger than the upper limit value of inequality (6), image stabilization sensitivity of the image stabilizing lens unit is too high, and accordingly, it becomes difficult to control the position of the lens unit during image stabilization.

Inequality (6) may be replaced with inequality (6a) below:

$$1.050 \leq \beta r \leq 1.650 \tag{6a}$$

Inequality (6) may be replaced with inequality (6b) below:

$$1.100 \leq \beta r \leq 1.550 \tag{6b}$$

In each example, the front group has a configuration close to that of an afocal system to reduce the sizes of the reflection unit PR and the rear group. As illustrated in FIG. 15, the reflection unit PR is disposed on the image side of the aperture stop SP and the size thereof is determined by an on-axis light beam. The on-axis light beam needs to be converged to reduce the size of the reflection unit PR, and the front group may have strong positive refractive power. However, in this case, the incident angle of an off-axis light beam on the aperture surface is acute, and thus the lens diameter of the rear group on the image side of the long reflection unit PR increases and interference between the rear groups becomes a problem.

Thus, in each example, a first lens unit L1 as the front group is constituted by a sub lens unit (positive sub lens unit) L1A having positive refractive power and a sub lens unit (negative sub lens unit) L1B having negative refractive power, the lens units being disposed in order from the object side to the image side. An air interval that is maximum in the front group is provided between the positive and negative sub lens units L1A and L1B. With this configuration, a substantially afocal system is achieved by the composite focal length of the positive and negative sub lens units L1A and L1B. An on-axis light beam is converged by the positive sub lens unit L1A having strong positive refractive power so that the size of the reflection unit PR can be reduced, and the incident angle of an off-axis light beam on the aperture surface is reduced by the negative sub lens unit L1B having strong negative refractive power. Accordingly, the lens diameter of the rear group can be reduced.

The following inequality (7) may be satisfied:

$$1.50 \leq |ff/f| \tag{7}$$

where ff represents the focal length of the front group.

Inequality (7) defines a condition relating to size reduction of the reflection unit PR and size reduction of the lens diameter of the rear group. In a case where ff/f is smaller than the lower limit value of inequality (7), the lens diameter of the rear group is large.

Inequality (7) may be replaced with inequality (7a) below:

$$2.00 \leq |ff/f| \tag{7a}$$

Inequality (7) may be replaced with inequality (7b) below:

$$2.40 \leq |ff/f| \tag{7b}$$

The following inequality (8) may be satisfied:

$$0.55 \leq f1A/f \leq 1.30 \tag{8}$$

where f1A represents the focal length of the positive sub lens unit L1A.

Inequality (8) defines a condition relating to size reduction of the reflection unit PR. In a case where f1A/f is smaller than the lower limit value of inequality (8), the refractive power of the positive sub lens unit L1A is too strong, and accordingly, spherical aberration and coma increase and optical performance of the optical system decreases. In a case where f1A/f is larger than the upper limit value of inequality (8), it is difficult to reduce the size of the reflection unit PR. Inequality (8) may be replaced with inequality (8a) below:

$$0.58 \leq f1A/f \leq 1.20 \tag{8a}$$

Inequality (8) may be replaced with inequality (8b) below:

$$0.60 \leq f1A/f \leq 1.10 \tag{8b}$$

The baseline length Din (optical axis interval between the front groups) and the optical axis interval Dout of the rear groups of the two optical systems may satisfy the following inequality (9):

$$0.05 \leq Dout/Din \leq 0.50 \tag{9}$$

Inequality (9) defines a condition relating to a stereoscopic effect and discomfort in stereoscopic viewing of an image obtained by image capturing. In a case where Dout/Din is smaller than the lower limit value of inequality (9), the baseline length is extremely longer than the interval between the eyes of a person, and accordingly, parallax of an image obtained through the two optical systems is too large and a viewer is highly likely to feel fatigued. In a case where Dout/Din is larger than the upper limit value of inequality (9), the image parallax is too small, and accordingly, no stereoscopic effect is obtained.

Inequality (9) may be replaced with inequality (9a) below:

$$0.10 \leq Dout/Din \leq 0.45 \tag{9a}$$

Inequality (9) may be replaced with inequality (9b) below:

$$0.15 \leq Dout/Din \leq 0.40 \tag{9b}$$

The configuration of each group of each optical system will be described below. In the following description, lens units and lenses constituting each group are disposed in order from the object side to the image side unless otherwise stated.

The first lens unit L1 as the front group in each example has substantially afocal refractive power disposition. In the first lens unit L1 according to Example 1, the positive sub lens unit L1A is constituted by a biconvex lens, and the negative sub lens unit L1B is constituted by a biconvex lens and a biconcave lens. In the first lens unit L1 of each of Examples 2, 3, and 4, the positive sub lens unit L1A is constituted by a biconvex lens, and the negative sub lens unit L1B is constituted by a cemented lens formed by joining a biconvex lens and a biconcave lens. In the first lens unit L1 according to Example 5, the positive sub lens unit L1A is constituted by a positive meniscus lens having a convex surface toward the object side, and the negative sub lens unit L1B is constituted by a cemented lens formed by joining a biconvex lens and a biconcave lens.

In each example, the aperture stop SP is disposed on the image side of the first lens unit L1, the reflection unit PR is disposed on the image side of the aperture stop SP, and the rear group is disposed on the image side of the reflection unit PR.

In Examples 1, 2, and 4, the rear group is constituted by a second lens unit L2 having positive refractive power, a third lens unit L3 having negative refractive power, a fourth lens unit L4 having positive refractive power, and a fifth lens unit L5 having negative refractive power. In Example 3, the rear group is constituted by a second lens unit L2 having positive refractive power, a third lens unit L3 having negative refractive power, and a fourth lens unit L4 having positive refractive power. In Example 5, the rear group is constituted by a second lens unit L2 having positive refractive power, a third lens unit L3 having negative refractive power, and a fourth lens unit L4 having positive refractive power.

In Examples 1, 2, and 4, the focus lens unit is the third lens unit L3, and the image stabilizing lens unit is the fourth lens unit L4. In Example 3, the focus lens unit is the third lens unit L3, and no image stabilizing lens unit is provided. In Example 5, the focus lens unit is the second lens unit L2, and the image stabilizing lens unit is the third lens unit L3.

In Examples 1 and 4, the second lens unit L2 is constituted by a positive meniscus lens having a convex surface toward on the image side, and a cemented lens formed by joining a biconvex lens and a negative meniscus lens having a convex surface toward on the image side. In Example 2, the second lens unit L2 is constituted by a positive meniscus lens having a convex surface toward on the image side and a cemented lens formed by joining a biconvex lens and a biconcave lens. In Example 3, the second lens unit L2 is constituted by a biconvex lens and a cemented lens formed by joining a biconvex lens and a negative meniscus lens having a convex surface toward on the image side. In Example 5, the second lens unit L2 is constituted by a cemented lens formed by joining a biconvex lens and a negative meniscus lens having a convex surface toward on the image side.

In Examples 1, 2, and 4, the third lens unit L3 is constituted by a cemented lens formed by joining a positive meniscus lens having a convex surface toward on the image side and a biconcave lens. In Example 3, the third lens unit L3 is constituted by a cemented lens formed by joining a biconvex lens and a biconcave lens. In Example 5, the third lens unit L3 is constituted by a cemented lens formed by joining a positive meniscus lens having a convex surface toward on the image side and a biconcave lens.

In Example 1, the fourth lens unit L4 is constituted by a cemented lens formed by joining a negative meniscus lens having a convex surface toward the object side and a positive meniscus lens having a convex surface toward the object side, and a positive meniscus lens having a convex surface toward the object side. In Examples 2 and 4, the fourth lens unit L4 is constituted by a cemented lens formed by joining a negative meniscus lens having a convex surface toward the object side and a positive meniscus lens having a convex surface toward the object side. In Example 1, image stabilization sensitivity is set to be higher than that in Examples 2 and 4, and eccentric aberration in optical image stabilization is reduced since the fourth lens unit L4 includes two positive lenses. In Example 3, the fourth lens unit L4 is constituted by a cemented lens formed by joining a biconvex lens and a biconcave lens, and a positive meniscus lens having a convex surface toward the object side. In Example 5, the fourth lens unit L4 is constituted by a cemented lens formed by joining a negative meniscus lens having a convex surface toward the object side and a biconvex lens, a biconcave lens, and a biconvex lens.

In Examples 1 and 4, the fifth lens unit L5 is constituted by a biconcave lens and a positive meniscus lens having a convex surface toward the object side. In Example 2, the fifth lens unit L5 is constituted by a negative meniscus lens having a convex surface toward the object side and a positive meniscus lens having a convex surface toward the object side.

Numerical data according to Numerical Examples 1 to 5 is presented below. In each numerical example, a surface number i is the order of a surface counted from the object side. In addition, r represents the curvature radius (mm) of the i-th surface from the object side, d represents the lens thickness or air interval (mm) between the i-th and (i+1)-th surfaces, and nd represents the refractive index of an optical material between the i-th and (i+1)-th surfaces at the d line. Furthermore, vdi represents the Abbe number of the optical material between the i-th and (i+1)-th surfaces at the d line. The Abbe number vd is expressed by vd=(Nd−1)/(NF−NC) where Nd, NF, and NC represent refractive indices at the d line (587.6 nm), the F line (486.1 nm), and the C line (656.3 nm) in the Fraunhofer line.

In addition, BF represents back focus (mm). "Back focus" is the air conversion length of the distance on the optical axis from the final surface (lens surface positioned closest to the image plane) of a zoom lens to the paraxial imaging plane. "Overall lens length" is the sum of the back focus and the distance on the optical axis from the foremost surface (lens surface positioned closest to the object) of the zoom lens to the final surface.

Table 1 collectively lists the relations among the above-described conditions (Inequalities (1) to (9)) and the numerical examples. Numerical Examples 1 to 4 satisfy all of Inequalities (1) to (9). Numerical Example 5 satisfies all of Inequalities (1) and (4) to (9) other than Inequalities (2) and (3).

FIGS. 2, 5, 8, 10, and 13 illustrate longitudinal aberrations (spherical aberration, astigmatism, distortion, and chromatic aberration) of the optical systems according to Numerical Examples 1 to 5, respectively, in an in-focus state at infinity. FIGS. 3, 6, 11, and 14 illustrate lateral aberrations of the optical systems according to Numerical Examples 1, 2, 4, and 5, respectively, in 0.5° image stabilization. In each spherical aberration diagram, Fno represents F-number, a solid line illustrates spherical aberration at the d line (wavelength 587.6 nm), and a dashed line illustrates spherical aberration at the g line (wavelength 435.8 nm). In each astigmatism diagram, a solid line S illustrates the sagittal imaging plane, and a dashed line M illustrates the meridional imaging plane. Each distortion diagram illustrates distortion at the d line. Each chromatic aberration diagram illustrates chromatic aberration of magnification at the g line. The symbol ω represents half angle of view (°). Any lens surface may be an aspherical surface.

Numerical Example 1

UNIT: mm
Surface Data

| Surface No | r | d | nd | vd | Effective Diameter |
|---|---|---|---|---|---|
| 1 | 51.287 | 2.71 | 1.76385 | 48.5 | 18.75 |
| 2 | −278.413 | 11.77 | | | 18.48 |
| 3 | 28.406 | 3.34 | 1.43875 | 94.7 | 14.15 |
| 4 | −41.071 | 0.20 | | | 13.40 |
| 5 | −40.184 | 1.20 | 1.78590 | 44.2 | 13.25 |
| 6 | 24.397 | 6.84 | | | 12.63 |
| 7(aperture stop) | ∞ | 2.00 | | | 12.53 |
| 8 | ∞ | 36.00 | 1.77250 | 49.6 | 12.50 |
| 9 | ∞ | 2.00 | | | 12.18 |
| 10 | −28.886 | 1.82 | 2.00100 | 29.1 | 12.16 |
| 11 | −20.478 | 0.20 | | | 12.47 |
| 12 | 18.794 | 4.39 | 1.49700 | 81.5 | 11.98 |
| 13 | −15.730 | 1.00 | 1.67270 | 32.1 | 11.65 |
| 14 | −60.435 | 2.11 | | | 11.57 |
| 15 | −73.822 | 2.41 | 2.00100 | 29.1 | 11.13 |
| 16 | −11.541 | 1.00 | 1.88300 | 40.8 | 11.09 |
| 17 | 16.372 | 3.52 | | | 10.77 |
| 18 | 22.190 | 1.00 | 1.80810 | 22.8 | 12.38 |
| 19 | 14.160 | 2.76 | 1.77250 | 49.6 | 12.35 |
| 20 | 121.562 | 0.20 | | | 12.35 |
| 21 | 23.551 | 1.81 | 1.77250 | 49.6 | 12.42 |
| 22 | 35.190 | 6.14 | | | 12.13 |
| 23 | −46.840 | 1.00 | 1.72916 | 54.7 | 11.74 |
| 24 | 18.038 | 2.60 | | | 11.90 |
| 25 | 19.649 | 3.16 | 1.69895 | 30.1 | 13.90 |
| 26 | 233.329 | 3.85 | | | 14.00 |
| 27 | ∞ | 11.45 | | | 14.49 |
| Image Plane | ∞ | | | | |

Various Data

| | |
|---|---|
| Focal Length | 75.00 |
| Fno. | 4.00 |
| Half Angle of View (°) | 6.09 |
| Image Height | 8.00 |
| Overall Lens Length | 116.50 |
| BF | 11.45 |
| Entrance Pupil Position | 38.42 |
| Exit Pupil Position | −55.05 |
| Front Principal Point Position | 28.83 |
| Rear Principal Point Position | −63.55 |

Lens Unit Data

| Lens Unit | Starting Surface | End Surface | Focal Length | Lens Structure Length |
|---|---|---|---|---|
| L1 | 1 | 6 | 657.01 | 19.22 |
| L2 | 10 | 14 | 23.41 | 7.42 |
| L3 | 15 | 17 | −17.22 | 3.41 |
| L4 | 18 | 22 | 25.40 | 5.77 |
| L5 | 23 | 27 | −53.20 | 10.62 |

Lens Unit Data

| Lens Unit | Front Principal Point Position | Rear Principal Point Position |
|---|---|---|
| L1 | −287.64 | −211.08 |
| L2 | 1.87 | −2.75 |
| L3 | 1.39 | −0.31 |
| L4 | −0.27 | −3.51 |
| L5 | −4.10 | −13.64 |

Fixed Focal Lens Data

| Lens | Starting Surface | Focal Length |
|---|---|---|
| 1 | 1 | 56.90 |
| 2 | 3 | 38.84 |
| 3 | 5 | −19.16 |
| 4 | 8 | 0.00 |
| 5 | 10 | 63.40 |
| 6 | 12 | 17.99 |
| 7 | 13 | −31.90 |
| 8 | 15 | 13.41 |
| 9 | 16 | −7.54 |
| 10 | 18 | −51.28 |
| 11 | 19 | 20.52 |
| 12 | 21 | 86.33 |
| 13 | 23 | −17.74 |
| 14 | 25 | 30.51 |

Numerical Example 2

UNIT: mm
Surface Data

| Surface No | r | d | nd | vd | Effective Diameter |
|---|---|---|---|---|---|
| 1 | 73.385 | 2.78 | 1.91650 | 31.6 | 18.75 |
| 2 | −240.253 | 2.95 | | | 18.50 |
| 3 | 26.794 | 3.77 | 1.65160 | 58.5 | 17.10 |
| 4 | −87.993 | 1.20 | 1.89800 | 34.0 | 16.20 |
| 5 | 22.993 | 15.23 | | | 15.16 |
| 6(aperture stop) | ∞ | 2.00 | | | 14.15 |
| 7 | ∞ | 36.75 | 1.77250 | 49.6 | 14.01 |
| 8 | ∞ | 2.00 | | | 12.50 |
| 9 | −66.445 | 1.93 | 1.80810 | 22.8 | 12.38 |
| 10 | −27.429 | 0.20 | | | 12.45 |
| 11 | 27.212 | 3.84 | 1.63860 | 63.4 | 11.96 |
| 12 | −17.943 | 1.00 | 1.71736 | 29.5 | 11.13 |
| 13 | 165.058 | 2.15 | | | 10.90 |
| 14 | −222.742 | 2.33 | 1.90058 | 29.7 | 10.66 |
| 15 | −12.336 | 1.00 | 1.84750 | 43.0 | 10.61 |
| 16 | 19.985 | 5.88 | | | 10.40 |
| 17 | 19.463 | 1.00 | 1.90110 | 27.1 | 12.50 |
| 18 | 12.695 | 3.41 | 1.72916 | 54.7 | 12.27 |
| 19 | 106.379 | 7.37 | | | 12.15 |
| 20 | 426.471 | 1.00 | 1.77250 | 49.6 | 12.03 |
| 21 | 13.209 | 1.87 | | | 11.98 |
| 22 | 14.817 | 3.34 | 1.71300 | 53.9 | 14.03 |
| 23 | 57.502 | 2.05 | | | 14.00 |
| 24 | ∞ | 11.45 | | | 14.25 |
| Image Plane | ∞ | | | | |

Various Data

| | |
|---|---|
| Focal Length | 75.00 |
| Fno. | 4.00 |
| Half Angle of View (°) | 6.09 |
| Image Height | 8.00 |
| Overall Lens Length | 116.50 |
| BF | 11.45 |

-continued

| | |
|---|---|
| Entrance Pupil Position | 33.09 |
| Exit Pupil Position | −44.58 |
| Front Principal Point Position | 7.71 |
| Rear Principal Point Position | −63.55 |

Lens Unit Data

| Lens Unit | Starting Surface | End Surface | Focal Length | Lens Structure Length |
|---|---|---|---|---|
| L1 | 1 | 5 | 223.06 | 10.70 |
| L3 | 9 | 13 | 29.86 | 6.97 |
| L4 | 14 | 16 | −23.62 | 3.33 |
| L5 | 17 | 19 | 37.25 | 4.41 |
| L6 | 20 | 23 | −58.03 | 8.25 |

Lens Unit Data

| Lens Unit | Front Principal Point Position | Rear Principal Point Position |
|---|---|---|
| L1 | −39.84 | −39.73 |
| L3 | 0.84 | −3.27 |
| L4 | 1.64 | −0.11 |
| L5 | −0.91 | −3.34 |
| L6 | −1.98 | −8.52 |

Fixed Focal Lens Data

| Lens | Starting Surface | Focal Length |
|---|---|---|
| 1 | 1 | 61.60 |
| 2 | 3 | 31.94 |
| 3 | 4 | −20.20 |
| 4 | 7 | 0.00 |
| 5 | 9 | 56.56 |
| 6 | 11 | 17.51 |
| 7 | 12 | −22.51 |
| 8 | 14 | 14.42 |
| 9 | 15 | −8.87 |
| 10 | 17 | −43.57 |
| 11 | 18 | 19.47 |
| 12 | 20 | −17.66 |
| 13 | 22 | 27.11 |

Numerical Example 3

UNIT: mm
Surface Data

| Surface No | r | d | nd | vd | Effective Diameter |
|---|---|---|---|---|---|
| 1 | 54.198 | 2.55 | 1.90110 | 27.1 | 18.90 |
| 2 | −1873.002 | 9.22 | | | 18.62 |
| 3 | 22.472 | 3.60 | 1.55032 | 75.5 | 15.13 |
| 4 | −37.590 | 1.20 | 1.68134 | 31.9 | 14.39 |
| 5 | 13.897 | 7.13 | | | 13.02 |
| 6(aperture stop) | ∞ | 2.00 | | | 13.26 |
| 7 | ∞ | 36.42 | 1.87070 | 40.7 | 13.34 |
| 8 | ∞ | 2.00 | | | 14.19 |
| 9 | 59.207 | 2.76 | 1.88300 | 40.8 | 14.30 |
| 10 | −30.665 | 0.20 | | | 14.16 |
| 11 | 32.684 | 4.02 | 1.52841 | 76.5 | 13.28 |
| 12 | −19.600 | 1.00 | 1.90315 | 29.8 | 12.65 |
| 13 | −121.948 | 2.00 | | | 12.50 |
| 14 | 91.820 | 3.60 | 1.86300 | 41.5 | 11.92 |
| 15 | −12.509 | 1.00 | 1.81600 | 46.6 | 11.54 |
| 16 | 11.332 | 4.23 | | | 10.69 |
| 17 | 27.186 | 3.70 | 1.61650 | 31.0 | 12.50 |
| 18 | −21.416 | 1.00 | 1.88300 | 40.8 | 12.72 |
| 19 | 38.021 | 0.21 | | | 13.19 |
| 20 | 14.888 | 2.99 | 1.74100 | 52.7 | 14.22 |
| 21 | 30.439 | 2.05 | | | 14.00 |
| 22 | ∞ | 11.45 | | | 14.19 |
| Image Plane | ∞ | | | | |

Various Data

| | |
|---|---|
| Focal Length | 55.00 |
| Fno. | 2.91 |
| Half Angle of View (°) | 8.28 |
| Image Height | 8.00 |
| Overall Lens Length | 104.33 |
| BF | 11.45 |
| Entrance Pupil Position | 32.28 |
| Exit Pupil Position | −38.82 |
| Front Principal Point Position | 27.11 |
| Rear Principal Point Position | −43.55 |

Lens Unit Data

| Lens Unit | Starting Surface | End Surface | Focal Length | Lens Structure Length |
|---|---|---|---|---|
| L1 | 1 | 5 | −7316.62 | 16.57 |
| L2 | 9 | 13 | 20.39 | 7.98 |
| L3 | 14 | 16 | −17.51 | 4.60 |
| L4 | 17 | 22 | 68.87 | 9.95 |

Lens Unit Data

| Lens Unit | Front Principal Point Position | Rear Principal Point Position |
|---|---|---|
| L1 | 3021.71 | 2129.43 |
| L2 | 0.51 | −4.24 |
| L3 | 3.00 | 0.44 |
| L4 | −3.83 | −10.12 |

Fixed Focal Lens Data

| Lens | Starting Surface | Focal Length |
|---|---|---|
| 1 | 1 | 58.49 |
| 2 | 3 | 26.11 |
| 3 | 4 | −14.75 |
| 4 | 7 | 0.00 |
| 5 | 9 | 23.21 |
| 6 | 11 | 23.82 |
| 7 | 12 | −25.98 |
| 8 | 14 | 12.96 |
| 9 | 15 | −7.15 |
| 10 | 17 | 20.01 |
| 11 | 18 | −15.39 |
| 12 | 20 | 36.35 |

Numerical Example 4

UNIT: mm

Surface Data

| Surface No | r | d | nd | vd | Effective Diameter |
|---|---|---|---|---|---|
| 1 | 75.189 | 3.55 | 1.49710 | 81.6 | 25.00 |
| 2 | −153.242 | 26.99 | | | 24.78 |
| 3 | 35.375 | 3.82 | 1.53256 | 46.0 | 17.62 |
| 4 | −45.357 | 1.20 | 1.89190 | 37.1 | 16.97 |
| 5 | 52.000 | 3.10 | | | 16.44 |
| 6(aperture stop) | ∞ | 2.00 | | | 16.22 |
| 7 | ∞ | 37.77 | 1.77250 | 49.6 | 16.04 |
| 8 | ∞ | 2.00 | | | 14.11 |
| 9 | −33.456 | 1.85 | 1.80518 | 25.4 | 14.00 |
| 10 | −23.789 | 0.20 | | | 14.21 |
| 11 | 21.250 | 4.58 | 1.52054 | 69.7 | 13.60 |
| 12 | −17.658 | 1.00 | 1.67270 | 32.2 | 12.69 |
| 13 | −79.466 | 2.00 | | | 12.15 |
| 14 | −71.262 | 2.18 | 1.91650 | 31.6 | 10.95 |
| 15 | −13.496 | 1.00 | 1.78650 | 50.0 | 10.66 |
| 16 | 17.100 | 6.37 | | | 10.32 |
| 17 | 21.874 | 1.00 | 1.90315 | 29.8 | 12.50 |
| 18 | 13.050 | 3.36 | 1.75591 | 51.2 | 12.32 |
| 19 | 100.961 | 13.42 | | | 12.25 |
| 20 | −78.564 | 1.00 | 1.61881 | 63.9 | 12.68 |
| 21 | 13.168 | 0.78 | | | 12.93 |
| 22 | 14.178 | 3.85 | 1.69680 | 56.5 | 13.94 |
| 23 | 90.207 | 2.04 | | | 14.00 |
| 24 | ∞ | 11.46 | | | 14.27 |
| Image Plane | ∞ | | | | |

Various Data

| | |
|---|---|
| Focal Length | 100.00 |
| Fno. | 4.00 |
| Half Angle of View (°) | 4.57 |
| Image Height | 8.00 |
| Overall Lens Length | 136.50 |
| BF | 11.46 |
| Entrance Pupil Position | 54.42 |
| Exit Pupil Position | −47.21 |
| Front Principal Point Position | −16.05 |
| Rear Principal Point Position | −88.54 |

Lens Unit Data

| Lens Unit | Starting Surface | End Surface | Focal Length | Lens Structure Length |
|---|---|---|---|---|
| L1 | 1 | 5 | 246.98 | 35.56 |
| L2 | 9 | 13 | 28.26 | 7.62 |
| L3 | 14 | 16 | −20.07 | 3.18 |
| L4 | 17 | 19 | 42.81 | 4.36 |
| L5 | 20 | 23 | −85.00 | 7.67 |

Lens Unit Data

| Lens Unit | Front Principal Point Position | Rear Principal Point Position |
|---|---|---|
| L1 | −80.92 | −84.33 |
| L2 | 1.94 | −2.87 |
| L3 | 1.34 | −0.33 |
| L4 | −1.04 | −3.41 |
| L5 | −1.09 | −6.79 |

Fixed Focal Lens Data

| Lens | Starting Surface | Focal Length |
|---|---|---|
| 1 | 1 | 101.99 |
| 2 | 3 | 37.94 |
| 3 | 4 | −27.01 |
| 4 | 7 | 0.00 |
| 5 | 9 | 94.24 |
| 6 | 11 | 19.30 |
| 7 | 12 | −33.97 |
| 8 | 14 | 17.84 |
| 9 | 15 | −9.45 |
| 10 | 17 | −37.86 |
| 11 | 18 | 19.51 |
| 12 | 20 | −18.15 |
| 13 | 22 | 23.65 |

Numerical Example 5

UNIT: mm

Surface Data

| Surface No | r | d | nd | vd | Effective Diameter |
|---|---|---|---|---|---|
| 1 | 42.896 | 2.64 | 2.00069 | 25.5 | 18.75 |
| 2 | 470.471 | 3.49 | | | 18.37 |
| 3 | 25.280 | 3.44 | 1.43875 | 94.7 | 16.41 |
| 4 | −406.305 | 1.20 | 1.85478 | 24.8 | 15.42 |
| 5 | 20.893 | 16.54 | | | 14.47 |
| 6(aperture stop) | ∞ | 2.00 | | | 13.49 |
| 7 | ∞ | 36.43 | 1.77250 | 49.6 | 13.36 |
| 8 | ∞ | 4.77 | | | 12.03 |
| 9 | 48.836 | 4.13 | 1.87070 | 40.7 | 11.70 |
| 10 | −12.410 | 1.00 | 1.90366 | 31.3 | 11.77 |
| 11 | −64.359 | 2.00 | | | 11.88 |
| 12 | −124.918 | 2.01 | 1.96300 | 24.1 | 11.73 |
| 13 | −18.591 | 1.00 | 1.80400 | 46.6 | 11.74 |
| 14 | 22.654 | 2.00 | | | 11.61 |
| 15 | 15.873 | 1.00 | 1.85478 | 24.8 | 12.50 |
| 16 | 12.543 | 3.86 | 1.59522 | 67.7 | 12.22 |
| 17 | −58.222 | 8.41 | | | 12.09 |
| 18 | −15.020 | 1.00 | 1.91082 | 35.3 | 10.23 |
| 19 | 25.969 | 2.63 | | | 10.77 |
| 20 | 27.330 | 3.45 | 1.76385 | 48.5 | 13.47 |
| 21 | −40.251 | 2.04 | | | 13.94 |
| 22 | ∞ | 11.46 | | | 14.33 |
| Image Plane | ∞ | | | | |

Various Data

| | |
|---|---|
| Focal Length | 75.00 |
| Fno. | 4.00 |
| Half Angle of View (°) | 6.09 |
| Image Height | 8.00 |
| Overall Lens Length | 116.50 |
| BF | 11.46 |
| Entrance Pupil Position | 39.07 |
| Exit Pupil Position | −49.36 |
| Front Principal Point Position | 21.58 |
| Rear Principal Point Position | −63.54 |

Lens Unit Data

| Lens Unit | Starting Surface | End Surface | Focal Length | Lens Structure Length |
|---|---|---|---|---|
| L1 | 1 | 5 | 255.70 | 10.77 |
| L2 | 9 | 11 | 34.90 | 5.13 |
| L3 | 12 | 14 | −28.70 | 3.01 |
| L4 | 15 | 22 | 56.70 | 22.39 |

Lens Unit Data

| Lens Unit | Front Principal Point Position | Rear Principal Point Position |
|---|---|---|
| L1 | −60.85 | −55.31 |
| L2 | 1.14 | −1.65 |
| L3 | 1.35 | −0.21 |
| L4 | −11.43 | −28.79 |

Fixed Focal Lens Data

| Lens | Starting Surface | Focal Length |
|---|---|---|
| 1 | 1 | 47.02 |
| 2 | 3 | 54.38 |
| 3 | 4 | −23.22 |
| 4 | 7 | 0.00 |
| 5 | 9 | 11.73 |
| 6 | 10 | −17.17 |
| 7 | 12 | 22.47 |
| 8 | 13 | −12.56 |
| 9 | 15 | −81.20 |
| 10 | 16 | 17.70 |
| 11 | 18 | −10.33 |
| 12 | 20 | 21.79 |

TABLE 1

| | | NUMERICAL EXAMPLE | | | | |
|---|---|---|---|---|---|---|
| | | 1 | 2 | 3 | 4 | 5 |
| INEQUALITY(1) | fp/d | 0.59 | 0.73 | 0.50 | 0.68 | 0.81 |
| INEQUALITY(2) | fs/f | −0.23 | −0.31 | −0.32 | −0.20 | 0.47 |
| INEQUALITY(3) | fi/f | 0.34 | 0.50 | — | 0.43 | −0.38 |
| INEQUALITY(4) | Bis | 0.110 | 0.367 | — | 0.282 | — |
| INEQUALITY(5) | fr/f | −0.71 | −0.77 | — | −0.85 | — |
| INEQUALITY(6) | Br | 1.472 | 1.344 | — | 1.215 | — |
| INEQUALITY(7) | |ff/f| | 8.76 | 2.97 | 133.03 | 2.47 | 3.41 |
| INEQUALITY(8) | f1A/f | 0.76 | 0.82 | 1.06 | 1.02 | 0.63 |
| INEQUALITY(9) | Dout/Din | 0.30 | 0.29 | 0.33 | 0.30 | 0.29 |

Image Pickup Apparatus

Figure 18:
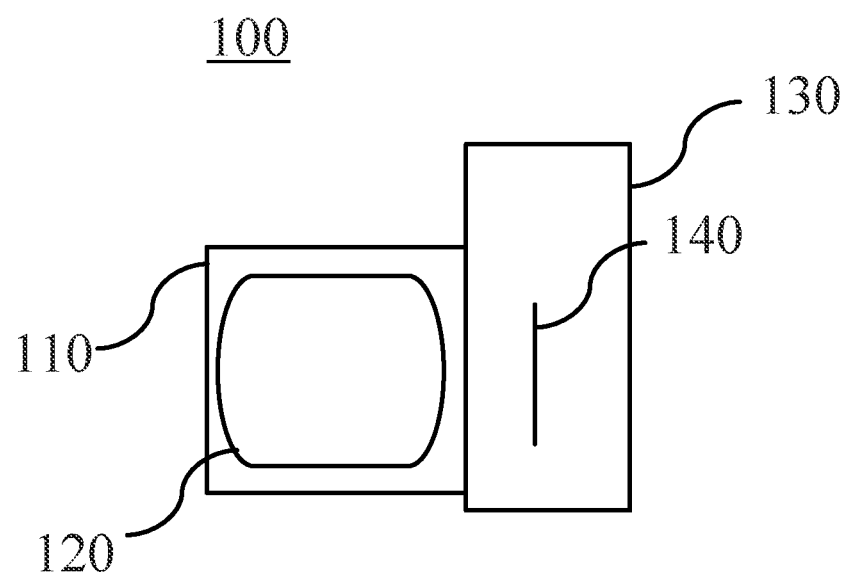
FIG. 18 illustrates an image pickup apparatus including any of the optical systems according to Examples 1 to 5.

FIG. 18 illustrates a schematic configuration of an image pickup apparatus (digital still camera) 100 including a lens apparatus 110 in Examples 1 to 5. The image pickup apparatus 100 is constituted by a camera body 130 including an image sensor 140, and the lens apparatus 110 detachably or integrally provided to the camera body 130. The camera body 130 may be a single-lens reflex camera including a mirror that reflects light from two optical systems (only one of the optical systems is illustrated in the diagram) 120 in the lens apparatus 110 or may be a mirrorless camera including no mirror. The image sensor 140 is a photoelectric conversion element configured to capture (photoelectrically convert) an optical image formed by the two optical systems 120.

Since the image pickup apparatus of this example includes the lens apparatus 110 according to Examples 1 to 5, it is possible to achieve at least one of focusing and optical image stabilization functions and acquire a high-quality stereoscopically viewable image.

This example can reduce drive difference between movable units in two optical systems of a stereoscopic lens apparatus.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-150919, filed on Sep. 22, 2022, which is hereby incorporated by reference herein in its entirety.

What is claimed is:

1. A stereoscopic lens apparatus comprising two optical systems disposed in parallel,
    wherein the two optical systems each include a front group, a reflection unit, and a rear group that are disposed in order from an object side to an image side, and an optical axis interval between the rear groups of the two optical systems is shorter than an optical axis interval between the front groups of the two optical systems due to optical path bending by the reflection unit,
    wherein the rear groups of the two optical systems each include a movable unit that can be moved,
    wherein the reflection units of the two optical systems are each constituted by a single optical member having two reflection surfaces, and
    wherein the stereoscopic lens apparatus further comprises:
    a holder integrally holding the movable units of the two optical systems, and
    an actuator configured to drive the holder,
    wherein each rear group includes a lens unit having negative refractive power and positioned closest to an image plane,
    wherein the following inequality is satisfied:

$$1.000 \leq \beta r \leq 1.800$$

where $\beta r$ represents lateral magnification of a lens unit having negative refractive power and positioned closest to the image plane in each rear group in an in-focus state at infinity.

2. The stereoscopic lens apparatus according to claim 1, wherein the two optical systems each include an aperture on the object side of the reflection unit,
    wherein each rear group includes a lens unit having positive refractive power and positioned closest to the object,
    wherein the following inequality is satisfied:

$$0.20 \leq fp/d \leq 1.20$$

where fp represents the focal length of the lens unit having positive refractive power and d represents a distance on an optical axis from the aperture to a lens surface positioned closest to the object in the lens unit having positive refractive power.

3. The stereoscopic lens apparatus according to claim 2, wherein each movable unit is disposed on the image side of the lens unit having positive refractive power in a corresponding rear group.

4. The stereoscopic lens apparatus according to claim 1, wherein each movable unit moves for focusing.

5. The stereoscopic lens apparatus according to claim 4, wherein each movable unit has negative refractive power, and
wherein the following inequality is satisfied:

$$-0.45 \leq fs/f \leq -0.15$$

where fs represents a focal length of the movable unit and f represents a focal length of a corresponding optical system.

6. The stereoscopic lens apparatus according to claim 1, wherein each movable unit moves for optical image stabilization.

7. The stereoscopic lens apparatus according to claim 6, wherein each movable unit has positive refractive power, and
wherein the following inequality is satisfied:

$$0.20 \leq fi/f \leq 0.65$$

where fi represents a focal length of the movable unit and f represents a focal length of a corresponding optical system.

8. The stereoscopic lens apparatus according to claim 6, wherein the following inequality is satisfied:

$$0.060 \leq \beta is \leq 0.600$$

where βis represents lateral magnification of each movable unit in an in-focus state at infinity.

9. The stereoscopic lens apparatus according to claim 1, wherein each rear group includes a lens unit having positive refractive power, a focus lens unit that has negative refractive power and moves for focusing as a corresponding movable unit, and an image stabilizing lens unit that has positive refractive power and moves for optical image stabilization as the movable unit, the lens units being disposed in order from the object side to the image side.

10. The stereoscopic lens apparatus according to claim 1, wherein the following inequality is satisfied:

$$-1.20 \leq fr/f \leq -0.40$$

where fr represents a focal length of a lens unit having negative refractive power and positioned closest to the image plane in each rear group and f represents a focal length of a corresponding optical system.

11. The stereoscopic lens apparatus according to claim 1, wherein the following inequality is satisfied:

$$1.50 \leq |ff/f|$$

where ff represents a focal length of each front group and f represents a focal length of a corresponding optical system.

12. The stereoscopic lens apparatus according to claim 1, wherein each front group includes a lens unit having positive refractive power and a lens unit having negative refractive power, the lens units being disposed in order from the object side to the image side, and an air interval that is maximum in the front group is provided between the positive and negative lens units.

13. The stereoscopic lens apparatus according to claim 1, wherein the following inequality is satisfied:

$$0.55 \leq f1A/f \leq 1.30$$

where f1A represents a focal length of a lens unit having positive refractive power in each front group and f represents a focal length of a corresponding optical system.

14. The stereoscopic lens apparatus according to claim 1, wherein the following inequality is satisfied:

$$0.05 \leq Dout/Din \leq 0.50$$

where Din represents the optical axis interval between the front groups of the two optical systems and Dout represents the optical axis interval between the rear groups of the two optical systems.

15. An image pickup apparatus comprising:
a stereoscopic lens apparatus; and
an image sensor configured to capture two optical images formed by two optical systems,
wherein the stereoscopic lens apparatus include two optical systems disposed in parallel,
wherein the two optical systems each include a front group, a reflection unit, and a rear group that are disposed in order from an object side to an image side, and an optical axis interval between the rear groups of the two optical systems is shorter than an optical axis interval between the front groups of the two optical systems due to optical path bending by the reflection unit,
wherein the rear groups of the two optical systems each include a movable unit that can be moved, wherein the reflection units of the two optical systems are each constituted by a single optical member having two reflection surfaces, and
wherein the stereoscopic lens apparatus further comprises:
a holder integrally holding the movable units of the two optical systems, and
an actuator configured to drive the holder,
wherein each rear group includes a lens unit having negative refractive power and positioned closest to an image plane,
wherein the following inequality is satisfied:

$$1.000 \leq \beta r \leq 1.800$$

where βr represents lateral magnification of a lens unit having negative refractive power and positioned closest to the image plane in each rear group in an in-focus state at infinity.

16. A stereoscopic lens apparatus comprising two optical systems disposed in parallel,
wherein the two optical systems each include a front group, a reflection unit, and a rear group that are disposed in order from an object side to an image side, and an optical axis interval between the rear groups of the two optical systems is shorter than an optical axis interval between the front groups of the two optical systems due to optical path bending by the reflection unit,
wherein the rear groups of the two optical systems each include a movable unit that can be moved,
wherein the stereoscopic lens apparatus further comprises:
a holder integrally holding the movable units of the two optical systems,
an actuator configured to drive the holder,
wherein the two optical systems each include an aperture on the object side of the reflection unit,
wherein each rear group includes a lens unit having positive refractive power and positioned closest to the object, and
wherein the following inequality is satisfied:

$$0.20 \leq fp/d \leq 1.20$$

where fp represents the focal length of the lens unit having positive refractive power and d represents a distance on an optical axis from the aperture to a lens surface positioned closest to the object in the lens unit having positive refractive power.

17. A stereoscopic lens apparatus comprising two optical systems disposed in parallel,
wherein the two optical systems each include a front group, a reflection unit, and a rear group that are disposed in order from an object side to an image side, and an optical axis interval between the rear groups of the two optical systems is shorter than an optical axis interval between the front groups of the two optical systems due to optical path bending by the reflection unit,
wherein the rear groups of the two optical systems each include a movable unit that can be moved,
wherein the stereoscopic lens apparatus further comprises:
a holder integrally holding the movable units of the two optical systems,
an actuator configured to drive the holder, and
wherein each movable unit moves for optical image stabilization.

18. A stereoscopic lens apparatus comprising two optical systems disposed in parallel,
wherein the two optical systems each include a front group, a reflection unit, and a rear group that are disposed in order from an object side to an image side, and an optical axis interval between the rear groups of the two optical systems is shorter than an optical axis interval between the front groups of the two optical systems due to optical path bending by the reflection unit,
wherein the rear groups of the two optical systems each include a movable unit that can be moved,
wherein the stereoscopic lens apparatus further comprises:
a holder integrally holding the movable units of the two optical systems, an actuator configured to drive the holder, and
wherein each rear group includes a lens unit having positive refractive power, a focus lens unit that has negative refractive power and moves for focusing as a corresponding movable unit, and an image stabilizing lens unit that has positive refractive power and moves for optical image stabilization as the movable unit, the lens units being disposed in order from the object side to the image side.

19. A stereoscopic lens apparatus comprising two optical systems disposed in parallel,
wherein the two optical systems each include a front group, a reflection unit, and a rear group that are disposed in order from an object side to an image side, and an optical axis interval between the rear groups of the two optical systems is shorter than an optical axis interval between the front groups of the two optical systems due to optical path bending by the reflection unit,
wherein the rear groups of the two optical systems each include a movable unit that can be moved,
wherein the stereoscopic lens apparatus further comprises:
a holder integrally holding the movable units of the two optical systems,
an actuator configured to drive the holder, and
wherein each front group includes a lens unit having positive refractive power and a lens unit having negative refractive power, the lens units being disposed in order from the object side to the image side, and an air interval that is maximum in the front group is provided between the positive and negative lens units.

* * * * *